Patented Apr. 28, 1942

2,281,252

UNITED STATES PATENT OFFICE 2,281,252

CONDENSATION PRODUCT OF STYRENE AND ARYL ETHERS

Frank B. Smith and Harold W. Moll, Midland, Mich., assignors to The Dow Chemical Company, Midland, Mich., a corporation of Michigan No Drawing. Application November 2, 1938, Serial No. 238,438

4 Claims. (Cl. 260—612)

This invention concerns new chemical products prepared by the condensation of styrene with certain aryl ethers, namely diphenyl ether, $C_6H_5 \cdot O \cdot C_6H_5$, and phenyldiphenyl ether,

$$C_6H_5 \cdot C_6H_4 \cdot O \cdot C_6H_5$$

The new products vary in physical properties from high-boiling viscous liquids to resinous or crystalline solids. They are substantially insoluble in water, but are soluble in a number of organic solvents such as benzene, carbon tetrachloride, toluene, etc. They may be employed as plasticizing agents for various synthetic plastic materials, e. g. cellulose ethers, nitrocellulose, cellulose acetate, polystyrene, etc., and are also useful as dielectric agents and as intermediates in the preparation of other chemical products.

The new condensation products are preferably prepared by reacting diphenyl ether or phenyldiphenyl ether with styrene in the presence of an alkylation catalyst, such as aluminum chloride, boron trifluoride, ferric bromide, acid activated bleaching clays such as those sold under the trade names "Retrol" and "Tonsil," etc., in such manner that polymerization of the styrene is substantially prevented. The reactants may be employed in any desired proportions, although the products obtained vary somewhat in properties with changes in such proportions. For example, when a molecular excess of the aryl ether is employed the product is a high-boiling viscous liquid which probably consists largely of a mixture of isomeric compounds formed by the substitution of a phenylethyl group into one of the benzene nuclei of the aryl ether. More highly substituted compounds may be obtained by increasing the proportion of styrene or by reacting styrene with the lower substituted products obtained from a previous reaction. Ordinarily, we prefer to employ approximately 0.5–2.0 moles of styrene per mole of aryl ether. The catalyst is usually employed in an amount representing 1–10 per cent by weight of the aryl ether employed.

The reaction for the formation of the new products is conveniently carried out by mixing a portion of the aryl ether with the styrene, and adding such mixture gradually and with stirring to a heated mixture comprising the remainder of the aryl ether and the catalyst. By operating in this manner, polymerization of the styrene during reaction is substantially prevented. The reaction temperature is usually maintained between about 150° C. and about 300° C., although in some instances lower or higher temperatures may be employed. The reaction is usually complete in from 1 to 6 hours, although a longer period may sometimes be required depending upon the proportion in which the reactants are employed. Upon completion of the reaction, the mixture is treated to remove the catalyst, and any unreacted aryl ether is distilled off under vacuum. The residual product may be employed directly as a plasticizing agent, chemical intermediate, etc., or it may be fractionally distilled to obtain fractions varying in physical properties from viscous liquids to resinous solids.

The following examples illustrate certain ways in which the principle of the invention has been applied, but are not to be construed as limiting the same:

Example 1

A mixture of 170 grams (1.0 mole) of diphenyl ether and 15 grams of Retrol was heated at 270° C. until all of the residual water contained in the Retrol had been driven off. A mixture of 340 grams (2.0 moles) of diphenyl ether and 276 grams (2.65 moles) of styrene was then added gradually with stirring over a period of 2.3 hours, during which time the temperature was maintained at approximately 270° C. Upon completion of the reaction, the mixture was cooled to 200° C. and filtered to remove the catalyst. The crude product thus obtained was a dark red fluorescent liquid. It was fractionally distilled under vacuum to obtain the following fractions:

| Fraction No. | Boiling range | Yield | Product |
|---|---|---|---|
| | | Grams | |
| 1 | 44°–130° C. at 20 mm | 10 | Styrene. |
| 2 | 130°–150° C. at 20 mm | 247 | Diphenyl ether. |
| 3 | 150°–210° C. at 20 mm | 26 | Mixed fraction. |
| 4 | 210°–248° C. at 20 mm | 191 | Probably isomeric mono-phenylethyl-diphenyl ethers. |
| 5 | Above 248° C. at 20 mm. | 147 | Probably isomeric poly-phenylethyl-diphenyl ethers. |

Upon standing at room temperature, a mass of white crystals was deposited from fraction 4. This crystalline product had a melting point of approximately 52° C., a specific gravity of about 1.074 at 60/60° C., and an index of refraction, $n^{60}_D = 1.5860$. It was probably 4-phenylethyl-diphenyl oxide. The liquid product, which probably consisted essentially of 2-phenylethyl-diphenyl ether, had a specific gravity of 1.082 at 25/25° C., and an index of refraction, $n^{25}_D = 1.6011$.

Example 2

A mixture of 246 grams (1.0 mole) of phenyl-diphenyl ether and 15 grams of Retrol was heated to 270° C. to drive off the residual water contained in the Retrol, after which time a mixture of 246 grams (1.0 mole) of phenyl-diphenyl ether and 184 grams (1.73 moles) of styrene was added as in Example 1. The time required for the addition of the styrene mixture was 20 minutes. The temperature was maintained at approximately 270° C. for one hour to insure complete reaction and the mixture was then cooled and filtered. The crude product thus obtained was a dark red viscous liquid. It was fractionally distilled under vacuum whereby the following fractions were obtained:

| Fraction No. | Boiling range | Yield | Product |
|---|---|---|---|
| | | Grams | |
| 1 | 40°-80° C. at 20 mm | 13 | Styrene. |
| 2 | 145°-218° C. at 20 mm | 375 | 2-phenyl-diphenyl ether. |
| 3 | 240°-290° C. at 20 mm | 161 | Probably isomeric mono-phenyl-ethyl-phenyl-diphenyl ether. |
| 4 | Above 290° C. at 20 mm | 102 | Probably isomeric poly-phenyl-ethyl-phenyl-diphenyl ether. |

Fraction 3 was a viscous yellow liquid, distilling almost entirely at 284° C. under 20 mm. pressure, and having a specific gravity of 1.078 at 60/4° C. and an index of refraction, $n^{25}_D = 1.6294$.

Other modes of applying the principle of our invention may be employed instead of those explained, change being made as regards the method herein disclosed, or the materials employed, provided the method stated by any of the following claims be employed, or the products claimed in any of the following claims be obtained.

We therefore particularly point out and distinctly claim as our invention:

1. A condensation product of styrene and diphenyl ether prepared by reacting styrene with diphenyl ether in the presence of an alkylation catalyst, said product distilling at temperatures between about 210° C. and about 248° C. under 20 millimeters pressure and consisting of a mixture of isomeric mono-phenylethyl-diphenyl ethers.

2. A condensation product of styrene and phenyl-diphenyl ether prepared by reacting styrene with phenyl-diphenyl ether in the presence of an alkylation catalyst, said product being a viscous yellow liquid, distilling at temperatures between about 240° C. and about 290° C. under 20 millimeters pressure and having a specific gravity of about 1.078 at 60/4° C. and consisting of a mixture of isomeric mono-phenylethyl-phenyl-diphenyl ethers.

3. The method of preparing a condensation product of styrene and an aryl ether selected from the group consisting of diphenyl ether and phenyl-diphenyl ether, which comprises adding a mixture of styrene and the aryl ether to a mixture of the aryl ether and an alkylation catalyst while heating the latter at a temperature between about 150° C. and about 300° C. whereby condensation of the styrene with the aryl ether is effected while substantially preventing polymerization of styrene.

4. The method of preparing a condensation product of styrene and an aryl ether selected from the group consisting of diphenyl ether and phenyl-diphenyl ether, which comprises adding a mixture of styrene and the aryl ether to a mixture of the aryl ether and an acid activated bleaching clay while heating the latter at a temperature between about 150° C. and about 300° C. whereby condensation of the styrene with the aryl ether is effected while substantially preventing polymerization of styrene.

FRANK B. SMITH.
HAROLD W. MOLL.